March 4, 1969     A. STRANG     3,430,753
POWDER FEEDING
Filed April 12, 1967
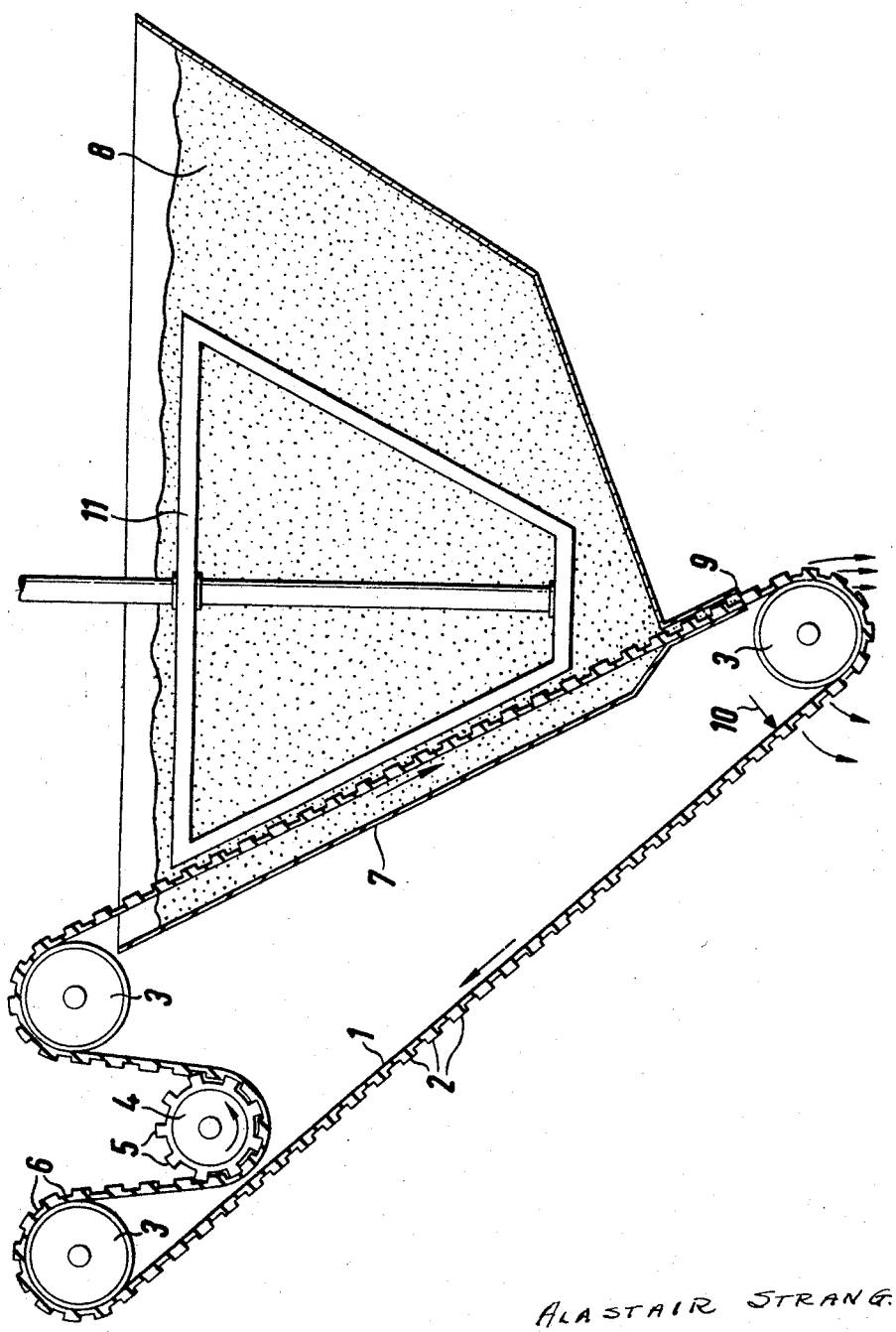
ALASTAIR STRANG.
INVENTOR
BY *Davis Hoxie Faithfull & Hapgood*
ATTORNEYS

United States Patent Office 3,430,753
Patented Mar. 4, 1969

3,430,753
POWDER FEEDING
Alastair Strang, Kenilworth, England, assignor to Courtaulds Limited, London, England, a British company
Filed Apr. 12, 1967, Ser. No. 630,345
Claims priority, application Great Britain, Apr. 15, 1966, 16,563/66
U.S. Cl. 198—53        1 Claim
Int. Cl. B65g 47/18, 65/30; A01f 25/00

ABSTRACT OF THE DISCLOSURE

The invention is a method of feeding powdered material continuously under controlled conditions in which a continuous driven belt having pockets or recesses at regular intervals in the surface thereof is fed with powdered material from a reservoir, preferably by passage of the belt through the reservoir containing powdered material, and the powdered material is subsequently discharged from the belt. The entire apparatus is preferably continuously weighed during the feeding process.

---

This invention relates to apparatus for feeding powdered materials in controllable quantities.

In many industrial processes powdered materials require to be fed at controlled rates and continuously or semi-continuously. Methods of feeding such powders may employ volumetric feed control in which the material is measured and fed into the process in regular volume measures. Such measures have the disadvantage that variations in bulk density affect the accuracy of feed control and it is clearly preferable to feed controlled weights of material. Such gravimetric methods do not, however, lend themselves readily to continuous processes, especially with some powdered materials.

According to the invention an apparatus for the continuous controlled feeding of powdered materials comprises a continuous feed belt having pockets or recesses at regular intervals in the surface thereof which are fed with powdered material from a reservoir, a drive for the continuous belt and discharge means for the powdered material from the continuous belt.

The continuous belt is preferably made of a flexible material such as rubber or a flexible plastics material, and may conveniently be in a form similar to that of the timing belt of a motor vehicle. Thus, it may have projections from its surface, which in this invention will be the outer surface of the continuous belt, which projections are regularly spaced and between which are regular depressions which are employed as measures for the powdered material. The drive means for the belt may suitably incorporate a sprocket which engages with the projections in order to ensure that the belt moves at a regular speed without slip.

The belt is fed with powdered material from a reservoir, for example, by passing the belt through a hopper which is filled with the powdered material, the emerging belt passing through a suitable orifice which is substantially sealed against free flow of powder past the belt itself. The discharging means for the powder may comprise simply the return path of the belt at which the inverted depressions or pockets in the belt discharge the powder to the process under the effect of gravity. It is preferred, however, to apply vibration, flexing and/or brushing to the belt at this point to assist in the disengagement of the powder therefrom.

The reservoir for the powdered material preferably should be provided with stirring means to maintain the powder in suitable condition to flow into the depressions or pockets on the continuous belt. Only a dry, free-flowing powder will flow satisfactorily into the belt without stirring. The stirring means may, for example, comprise a framework which rotates within the reservoir, preferably having an edge which sweeps close to the surface of the belt. The rate of rotation of the stirrer must be sufficient to ensure that no point on the surface of the belt may pass through the reservoir without encountering at least one sweep of the stirrer.

In order that a continuous check may be made upon the weight of powder being fed in a controlled volumetric measure by the apparatus, the entire feed apparatus may, if desired, be weighed continuously, for example by suspension from the weigh beam of a weighing machine. This provides a continuous check and the weighing machine may in fact be employed to control the rate of movement of the continuous belt in order to control the feed rate at the desired value.

The apparatus will be further described with reference to the accompanying drawing, which represents diagrammatically a powder feeding apparatus in accordance with the invention.

In the drawing a belt 1 having projections 2 passes around idler pulleys 3 and under a drive sprocket 4 which has teeth 5 engaging with the depressions 6 between the projections 2 of the belt 1. The belt 1 passes through a hopper 7, through the powdered material 8 and emerges through an orifice 9. A vibrator (not shown) may be applied to the belt 1 at 10 to assist in the disengagement of powdered material therefrom. A stirrer 11 driven by means (not shown) coupled to the driving means of the belt 1 rotates within the hopper 7 and sweeps close to the surface of the belt 1. The entire assembly is supported on weighing means (not shown) whereby the powder may be weighed out of the hopper 7.

I claim:

1. Apparatus for the continuous controlled feeding of powdered material which comprises a reservoir adapted to hold powdered material, a discharge duct leading from said reservoir, an endless flexible conveyor belt having a plurality of cavities on one surface thereof, extending through said reservoir and emerging from said reservoir through said discharge duct, said duct forming a seal about said belt, a rotatable stirrer in said reservoir, said stirrer having an edge and being positioned to cause said edge to pass closely adjacent to said belt during passage of said belt through said reservoir; and drive means for moving said belt through said reservoir to pick up material from said reservoir in said cavities and transport it through said discharge duct.

References Cited

UNITED STATES PATENTS

| | | | |
|---|---|---|---|
| 688,780 | 12/1901 | Haskard | 198—53 X |
| 1,763,139 | 6/1930 | Edwards | 198—57 X |
| 2,142,984 | 1/1939 | Thurman. | |
| 2,822,024 | 2/1958 | Himmelheber et al. | 198—39 X |
| 2,873,847 | 2/1959 | Holland | 198—230 |
| 3,253,305 | 5/1966 | Granath | 198—53 |
| 3,321,060 | 5/1967 | Mullis et al. | 198—16 |

EVON C. BLUNK, *Primary Examiner.*

M. L. AJEMAN, *Assistant Examiner.*

U.S. Cl. X.R.
214—17; 222—226, 371